(12) United States Patent
Nieminski et al.

(10) Patent No.: US 6,260,914 B1
(45) Date of Patent: Jul. 17, 2001

(54) SYMMETRICAL DASH REINFORCEMENT

(75) Inventors: Brant R. Nieminski; Gary E. Monteith, both of Fort Wayne, IN (US); Charles W. Kipfer, Payne, OH (US); Brian P. Gibbs; Norbert E. Romie, both of Fort Wayne, IN (US); David H. Thomas, Woodburn, IN (US); Gordon J. Wolverton, Lake Orin, MI (US)

(73) Assignee: International Truck and Engine Corporation, Chicago, IL (US)

( * ) Notice: Subject to any disclaimer, the term of this patent is extended or adjusted under 35 U.S.C. 154(b) by 0 days.

(21) Appl. No.: 09/580,190

(22) Filed: May 26, 2000

Related U.S. Application Data
(60) Provisional application No. 60/135,961, filed on May 26, 1999.

(51) Int. Cl.[7] ..................................................... B62D 33/06
(52) U.S. Cl. ..................... 296/190.08; 296/192; 280/779
(58) Field of Search ........................ 296/190.01, 190.08, 296/192, 194, 203.02; 180/90 (U.S. only); D12/96; 280/779

(56) References Cited

U.S. PATENT DOCUMENTS

| | | | |
|---|---|---|---|
| 1,823,156 | * 9/1931 | McDowell et al. | 296/192 |
| 2,959,239 | 11/1960 | Kenlock. | |
| 4,217,792 | * 8/1980 | Kesling | 280/779 X |
| 4,353,430 | 10/1982 | Sjoqvist. | |
| 4,767,153 | * 8/1988 | Kawasaki et al. | 296/194 |
| 4,978,163 | 12/1990 | Savio. | |
| 5,863,093 | 1/1999 | Novoa et al.. | |

FOREIGN PATENT DOCUMENTS 0 029 880 A1    6/1981   (EP).

* cited by examiner

*Primary Examiner*—Dennis H. Pedder
(74) *Attorney, Agent, or Firm*—Jeffrey P. Calfa; Dennis Kelly Skillivan Gilberto Hernandez; Neil T. Powell (57) ABSTRACT

A dash reinforcement for a mobile vehicle with a passenger cab such as a sport utility vehicle, or medium or heavy-duty truck. The dash reinforcement may be a stamped sheet metal panel that strengthens the dash structure of the cab and provides for mounting of vehicle components. The dash reinforcement may be symmetrical about the centerline of the vehicle and this symmetry allows the panel to accommodate both left-hand drive and right-hand drive vehicle configurations. The dash reinforcement also includes 'Y' shaped passages for a driver control module and for accessory equipment such as heating, ventilation, and air conditioning (HVAC) modules. The unique shape of these passages or openings adds strength to the overall dash structure and hence the cab. The dash reinforcement may be engaged to a dash panel to form a dash assembly. The dash panels made be manufactured by the same metal stamping dies moved to account for left-hand versus right-hand drive and conventional versus cab-over-engine or low front engine configuration.

49 Claims, 9 Drawing Sheets

SYMMETRICAL DASH REINFORCEMENT

This is a non-provisional application claiming priority under provisional patent application Ser. No. 60/135,961, filed May 26, 1999.

BACKGROUND OF THE INVENTION

This invention relates to dash reinforcements and dash assemblies for mobile vehicle with a passenger cab such as a sport utility vehicle, or medium or heavy-duty truck. The dash reinforcement may be a stamped sheet metal panel that strengthens the dash structure of the cab and provides for mounting of vehicle components. The dash reinforcement of this invention is symmetrical about the centerline of the vehicle and this symmetry allows the panel to accommodate both left-hand drive and right-hand drive vehicle configurations. The dash reinforcement also includes 'Y' shaped passages for a driver control module and for accessory equipment such as heating, ventilation, and air conditioning (HVAC) modules. The dash reinforcement may be engaged to a dash panel to form a dash assembly.

PRIOR ART

Vehicle cabs have previously been comprised of a series of sheet metal parts welded or otherwise fastened together. A forwardly and generally vertical portion of the cab comprising one of these sheet metal parts has been the dash reinforcement panel. This dash reinforcement panel is located on a lower forward portion of the cab. The dash reinforcement extends vertically from the front edge of the floor to the lower edge of the windshield and spans the width of the cab. The dash reinforcement provides structural support to various vehicle components. When the vehicle is fully assembled a dash panel was joined to the dash reinforcement to make up a dash assembly. Prior art dash reinforcements, dash assemblies, and cabs of this type are shown in U.S. Pat. Nos. 4,978,163 and 5,863,093. The prior art reinforcement panels were asymmetrical about the centerline of the vehicles when installed. This asymmetry was characterized in that the primary passages or mounting locations on the panel were different from right to left side of the panel and hence the vehicle when installed. These passages or mounting locations were for vehicle components such as steering columns, brake and accelerator pedals, and accessory equipment such as HVAC. Left-hand drive vehicles required different dash reinforcements than right-hand drive for the same make and model vehicles. Where there were significant sized openings on each side of the reinforcement, albeit different in shape as shown in U.S. Pat. No. 4,978,163, these holes reduced the overall strength and rigidity of the dash reinforcements. This was particularly true where the dash reinforcement arched over the engine compartment. Additionally, the dash reinforcement had to be of different stamped pieces depending on usage in a left-hand drive or right-hand drive application or whether in a conventional engine mounted forward of the cab or low front entry (LFE), engine under cab, application.

To date, a dash reinforcement, a dash assembly, or a vehicle incorporating a dash reinforcement has not been suggested which provides for symmetry across the major passages or openings in the reinforcement panel, same size holes for driver control equipment or module and accessory equipment such as HVAC equipment or modules, enhanced major opening shape for enhanced rigidity, and one stamped for the dash reinforcement configuration regardless of left-hand, right-hand drive, or conventional or LFE configuration.

SUMMARY OF INVENTION

As a result, a primary object of this invention is to provide a dash reinforcement that provides for symmetry across the major passages or openings in the reinforcement panel. A second object of the invention is to provide a dash reinforcement that has same size and shape holes for driver control equipment or module and accessory equipment such as HVAC equipment or modules. A third object of the invention is to provide a dash reinforcement that has enhanced major opening shape for enhanced rigidity. A fourth object of the invention is to provide a dash panels for engagement to the dash reinforcement that may be made stamped for the dash panel configuration regardless of left-hand, right-hand drive, or conventional or LFE configuration using shared tooling dies.

The dash reinforcement and dash panel of this invention satisfies all of the above objects plus others not mentioned. The dash reinforcement is a sheet metal panel formed of high strength sheet steel. This dash reinforcement is located on a lower forward portion of the cab. Stamping may form the sheet metal. The dash reinforcement extends vertically from the front edge of the floor to the lower edge of the windshield and spans the width of the cab. The dash reinforcement arches over the engine compartment since the front of the truck cab is immediately over the rear end of the engine. The dash reinforcement has two large openings to accommodate HVAC components and the steering column mounting, as well as smaller holes for mounting components such as air cleaner or wind shield wiper system. These two large openings are in the same generally 'Y' shape to add rigidity to the dash reinforcement. These two large 'Y' openings will be referred to as the 'double Y' configuration. The double 'Y' openings may be symmetrical to each other on the dash reinforcement relative to the centerline of the dash reinforcement and hence the cab. This symmetry allows for the steering column mounting or a multi-component driver control module containing the steering column to be mounted on either side of the dash reinforcement without the need to asymmetrically relocate associated steering equipment such as a steering gear on vehicle chassis. This configuration allows for both left-hand and right-hand drive vehicles to be produced using the same dash reinforcement.

The dash reinforcement is closely related to the dash panel. The dash panel acts as a heat and noise barrier between the passenger and the engine compartment. The dash panel is flat for the majority of its area. The top of the dash panel is flanged to allow assembly with the dash reinforcement.

The dash reinforcement is fastened to the dash panel by spot welding. The welded assembly of the dash reinforcement and the dash panel complete the structure for the front face of the cab. Together, the dash panel and the dash reinforcement, also in combination referred to as the cowl, carry the loads entering the cab structure through the front cab mounts as well as provide mounting for the vehicle components: air cleaner, HVAC, driver control module, electrical systems, windshield wiper system, and the instrument panel. The front cab mounts are engaged to the cab immediately adjacent to the bottom of the portions of the dash reinforcement containing the bottom of the 'Y' shaped openings.

The cross-sectional shape of the dash reinforcement increases the rigidity and strength of the part. The assembly of the dash panel and the dash reinforcement is subjected to various complex-loading conditions. The dash assembly would best perform as a single continuous shear panel to resist vertical out of phase loads transmitted through the front cab mounts. Due to the engine packaging, the center of the ideal shear panel must be removed for conventional engine mounting, reducing the structural efficiency and allowing twisting of the cowl section generated by out of phase fore/aft loads, The unique 'double Y' configuration of the dash reinforcement stabilizes the large shear panel outboard of the engine opening, while the cross section of the cowl acts in torsion to manage to manage out of phase fore/aft loading. This fore/aft loading may be a result of the cab mounts on one side of the vehicle reacting to a bump sensed by a chassis of the vehicle on that side only. The depressions in the dash panel across the engine opening have been customized to endure the complex stress pattern generated by the complex and dynamic loading conditions.

The dash panel may be made from a combination of the same stamping dies moved to account for left-hand versus right-hand drive, or for conventional engine versus LFE configuration. Areas of the rough stamping may be trimmed away to account for the different variations.

DRAWINGS

Other objects and advantages of the invention will become more apparent upon perusal of the detailed description thereof, In upon inspection of the drawings, in which.

DETAILS OF INVENTION

Figure 1:
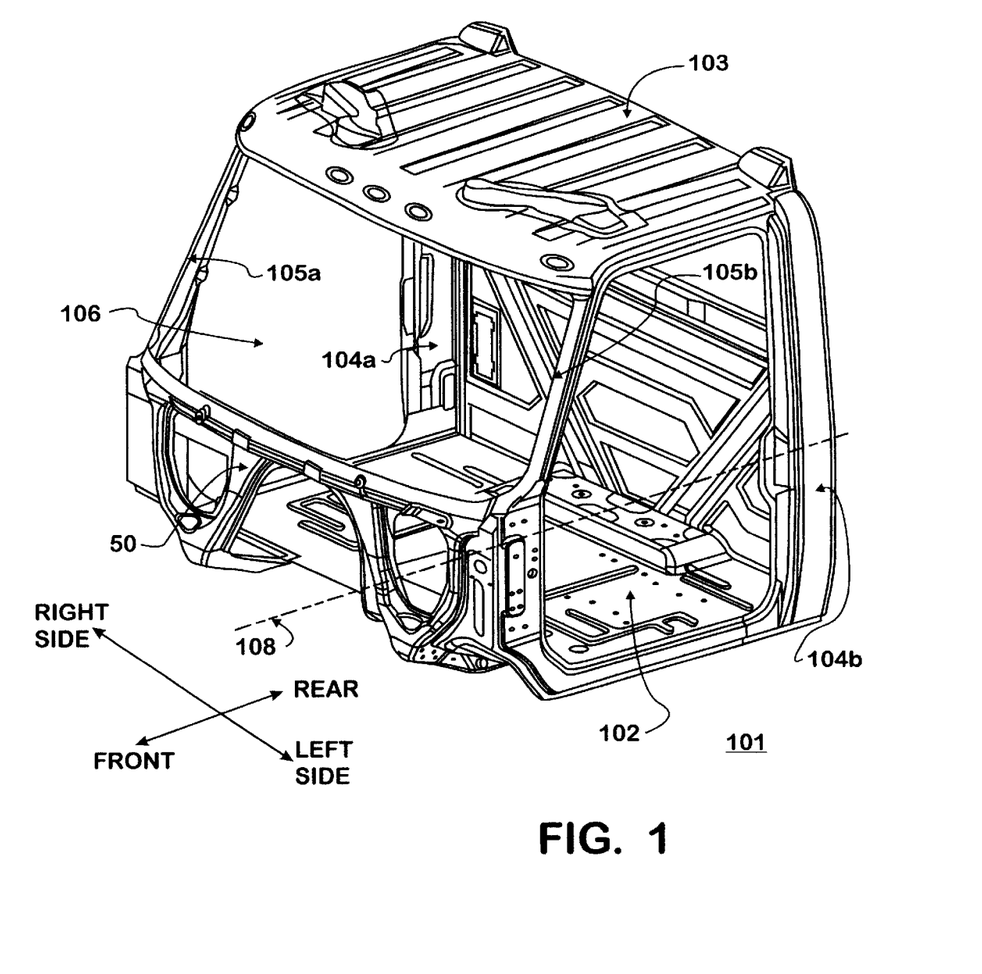
FIG. 1 is a perspective view of a cab of vehicle containing a dash reinforcement made in accordance with this invention.
Figure 2:
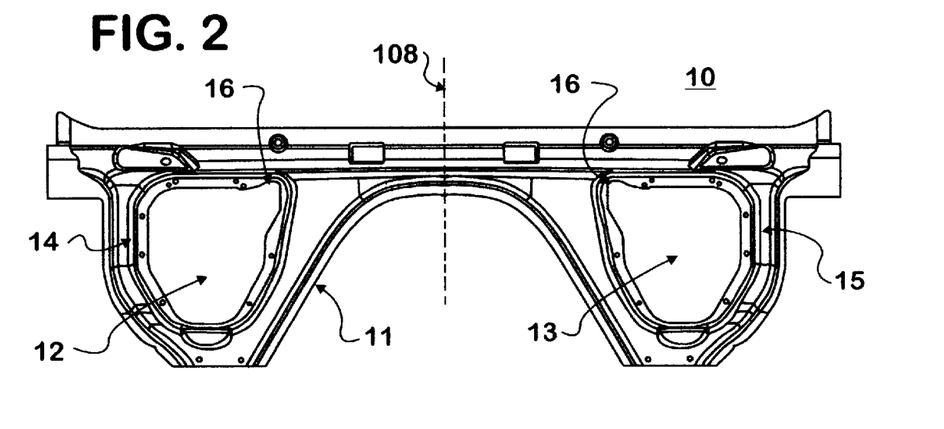
FIG. 2 is a front view of the dash reinforcement for use in the cab of FIG. 1.
Figure 3:
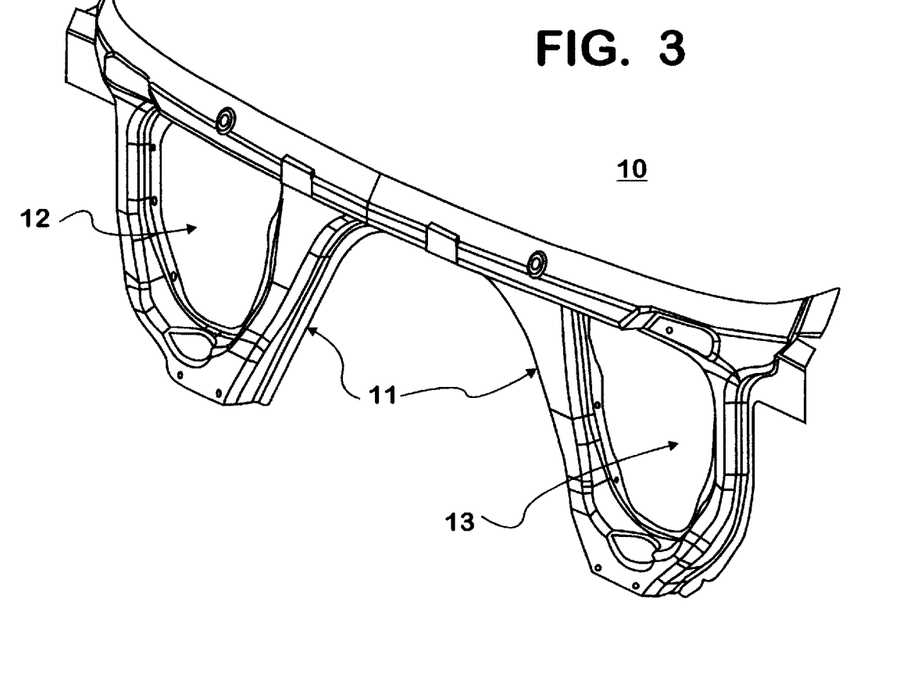
FIG. 3 is a perspective view of the dash reinforcement of FIG. 2.
Figure 4:
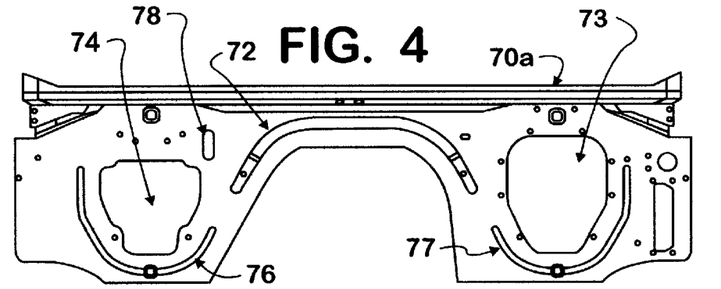
FIG. 4 is a front view of dash panel for left-hand drive conventional engine configuration made for use with the dash reinforcement of FIG. 2.
Figure 5:
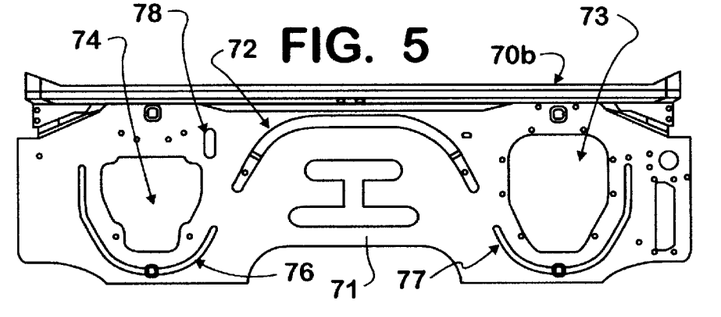
FIG. 5 is a front view of dash panel for left-hand drive LFE engine configuration made for use with the dash reinforcement of FIG. 2.
Figure 6:
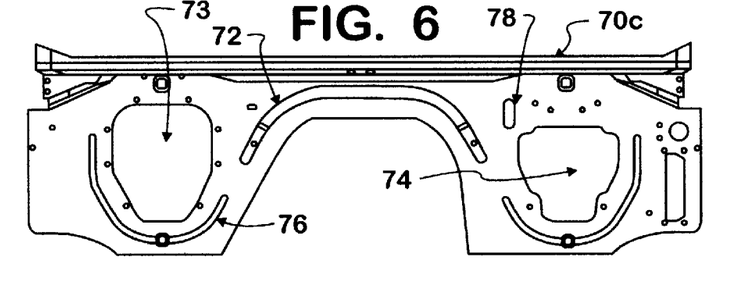
FIG. 6 is a front view of dash panel for right-hand drive conventional engine configuration made for use with the dash reinforcement of FIG. 2.
Figure 7:
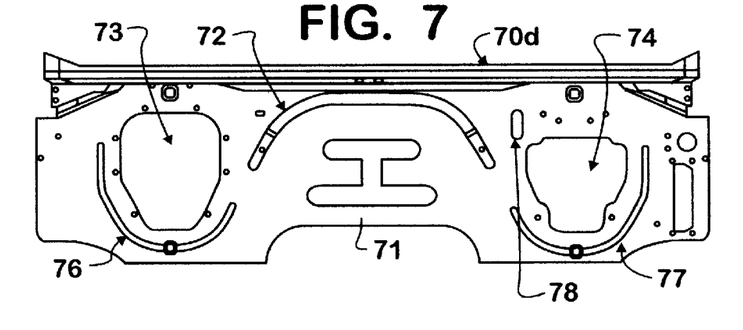
FIG. 7 is a front view of dash panel for right-hand drive LFE engine configuration made for use with the dash reinforcement of FIG. 2.
Figure 8:
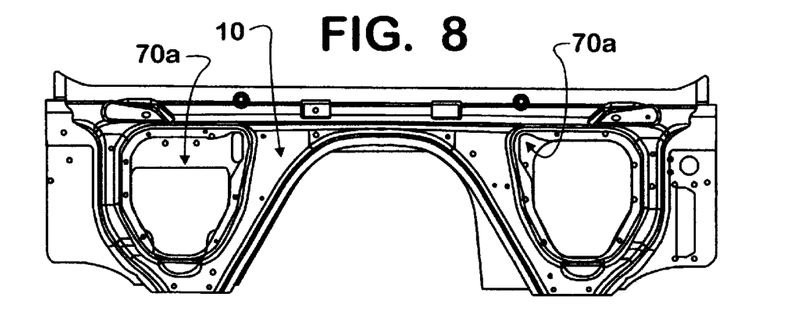
FIG. 8 is a front view of a dash assembly comprised of the combination of the dash reinforcement of FIG. 2 and the dash panel of FIG. 4.
Figure 9:
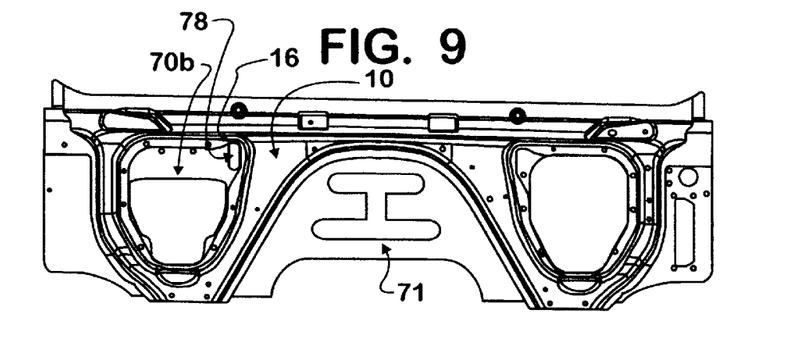
FIG. 9 is a front view of a dash assembly comprised of the combination of the dash reinforcement of FIG. 2 and the dash panel of FIG. 5.
Figure 10:
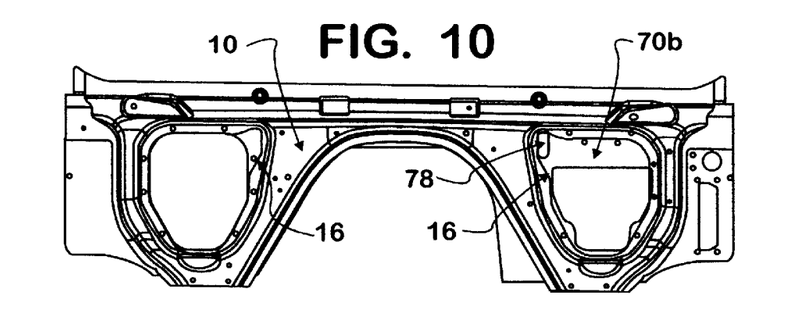
FIG. 10 is a front view of a dash assembly comprised of the combination of the dash reinforcement of FIG. 2 and the dash panel of FIG. 6.
Figure 11:
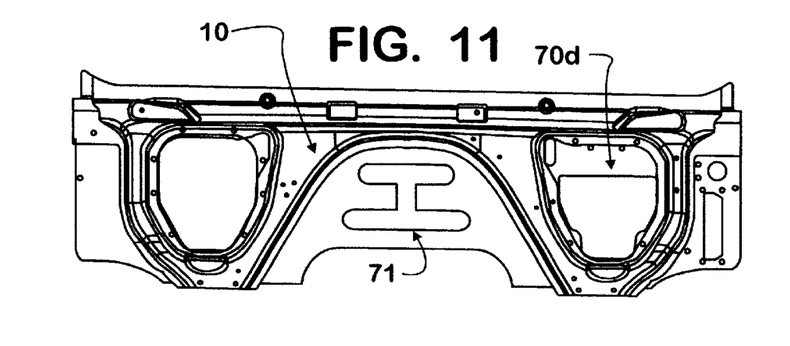
FIG. 11 is a front view of a dash assembly comprised of the combination of the dash reinforcement of FIG. 2 and the dash panel of FIG. 7.
Figure 12:
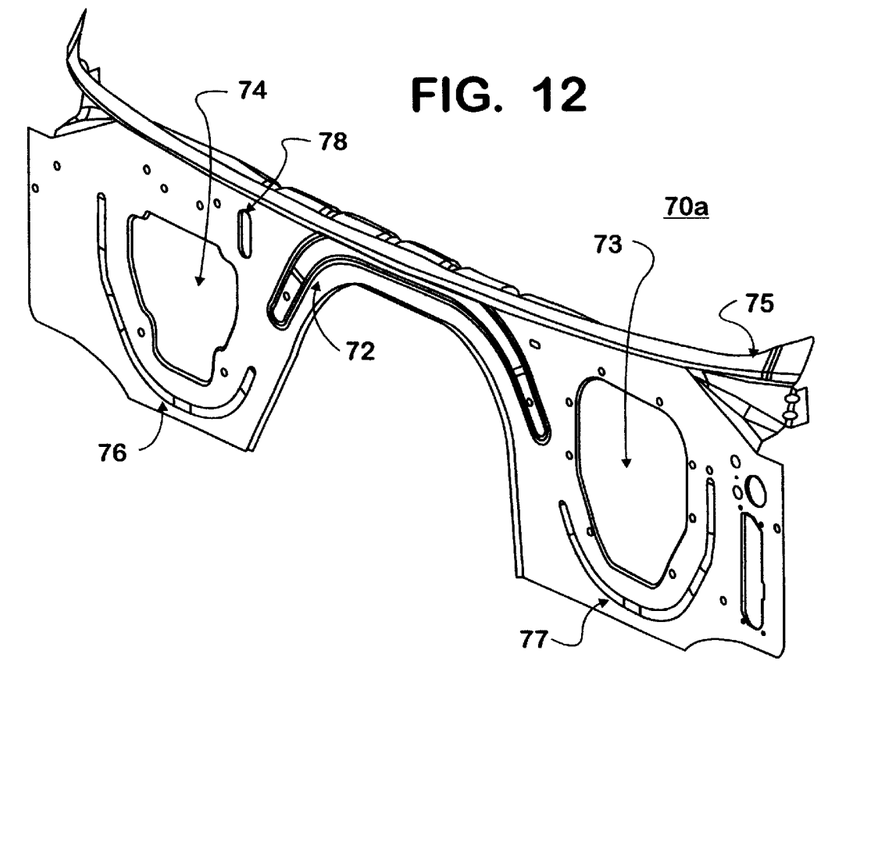
FIG. 12 is a perspective view of a dash panel made in accordance with this invention.
Figure 13:
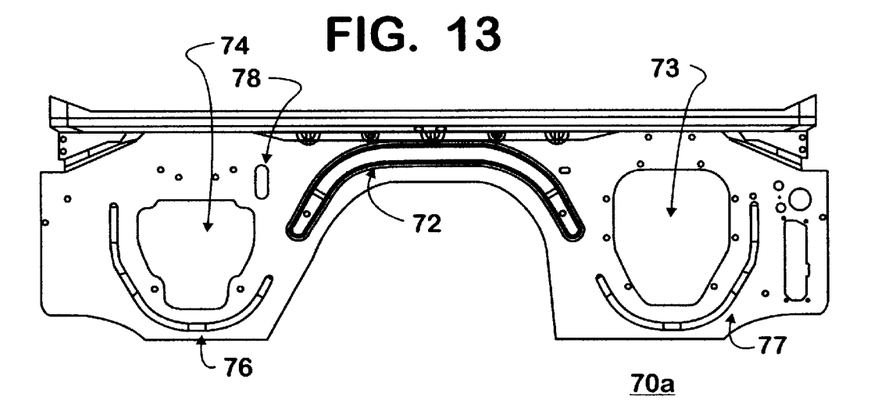
FIG. 13 is a front view of the dash panel of FIG. 12.

A vehicle cab 101 with a dash assembly 50 is shown in FIG. 1. During mobile vehicle assembly, the cab 101 is installed on a vehicle chassis. The chassis contains at least two axles mounted to it. One of these axles has at least one pair of steerable wheels. A driver of the vehicle will control the steerable wheels from the cab 101. The vehicle may be either right hand drive where the driver sits on right side of the cab 101 to steer the vehicle or left hand drive where the driver sits on the left hand side of the cab 101. The vehicle contains an engine compartment for the vehicle engine. The vehicle may be a conventional design where the engine compartment is forward of the cab 101 or the vehicle may be a cab-over-engine where the cab 101 is located over the engine. The cab-over-engine design may also be referred to as a low front entry (LFE) vehicle. The cab 101 is mounted to the chassis through forward right side and left side vibration mounting insulators between a forward portion of the cab 101 and the chassis. FIGS. 2 to 3 show dash reinforcement 10 of the dash assembly 50 and made in accordance with this invention. The invention in its most basic form involves a dash reinforcement that may be used for both left hand and right hand drive vehicle cabs and for both conventional engine forwards of the cab and cab-over-engine applications.

The vehicle cab 101 is generally comprised of: a floor 102, a roof 103, a right side wall 104*a* with a right side 'A' pillar 105*a*, a left side wall 104*b* with a left side 'A' pillar 105*b*, and a dash assembly 50. The term right side and left side as used throughout this application are relative to a person seated within the vehicle. The dash assembly 50 is generally comprised of dash reinforcement 10 and a dash panel 70. The right side and left sidewalls 104*a* and 104*b* are engaged to and between the floor 102 and the roof 103. The roof 103, the left side and right side 'A' pillars 105*a* and 105*b*, and the dash reinforcement 10 define a windshield mounting area 106. The cab 101 has a centerline 108 for reference. FIGS. 4 to 15 show dash reinforcements, dash panels, and dash assemblies made in accordance with this invention. The dash reinforcement 10 shown in FIGS. 1 to 3 is comprised of sheet metal extending vertically the distance from the front edge of the floor 102 of the cab to the lower edge of the windshield 106. This sheet metal spans the distance of the width of the cab 101. The sheet metal of the dash reinforcement 10 forms an arch 11 to allow installation over the engine compartment. The sheet metal of the dash reinforcement 10 has two large openings, a right side opening 12 on a right side 14 of said sheet metal and a left side opening 13 on a left side 15 of said sheet metal. The dash reinforcement 10 may be a single stamped piece of sheet metal. The sheet metal is preferably high strength steel.

Figure 16:
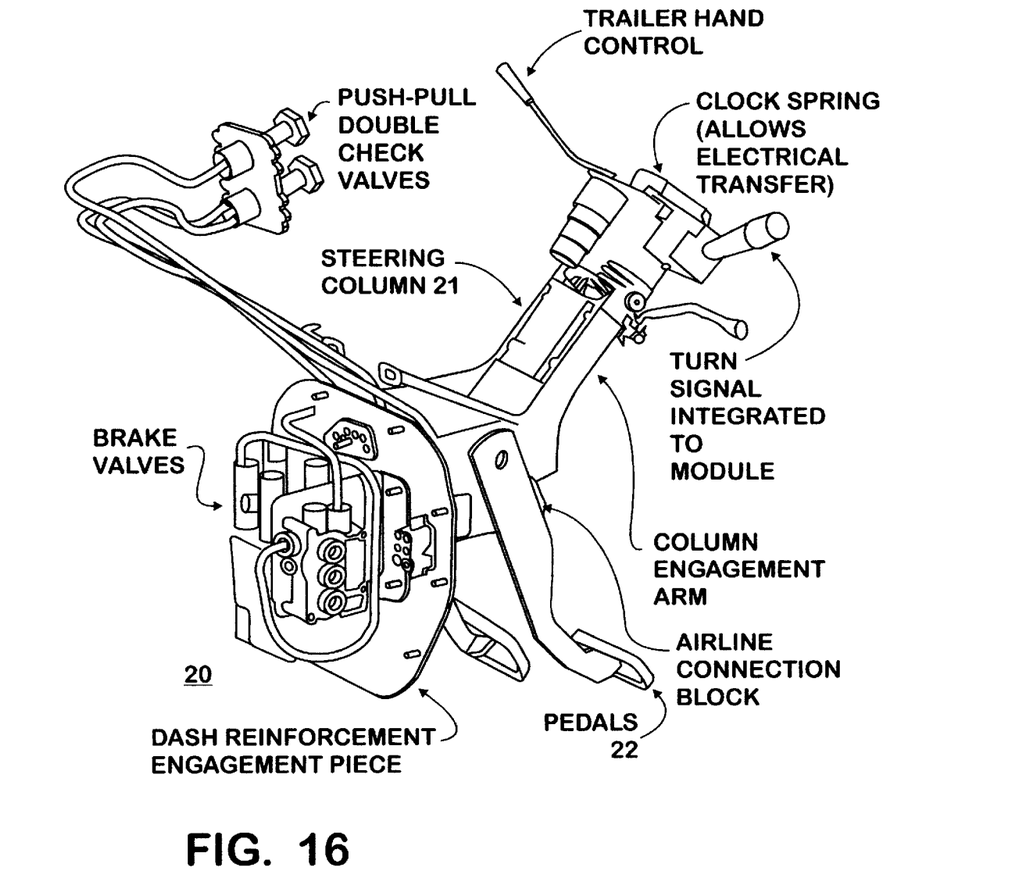
FIG. 16 is an example of a driver control module for installation in a dash reinforcement and dash assembly made in accordance with this invention.

The right side opening 12 and the left side opening 13 are on opposite sides of the over engine compartment arch 11. One opening is to accommodate a steering column mounting for engagement to the steerable wheels and one opening is to accommodate an accessory component. For a left hand drive vehicle, the steering column mounting would be mounted through the left hand opening 13 and similarly for a right hand drive vehicle, the steering column mounting would be mounted through the right hand opening 12. One method of installing the steering column 21 would be by use of driver control module 20, an example of which is shown in FIG. 16. The driver control module 20 may contain vehicle operator pedals and the driver steering column 21 and a steering wheel for indirect engagement to and control of the steerable wheels upon installation in the vehicle. In the preferred embodiment, the right side opening 13 is a mirror image of the left side opening 12.

Figure 17:
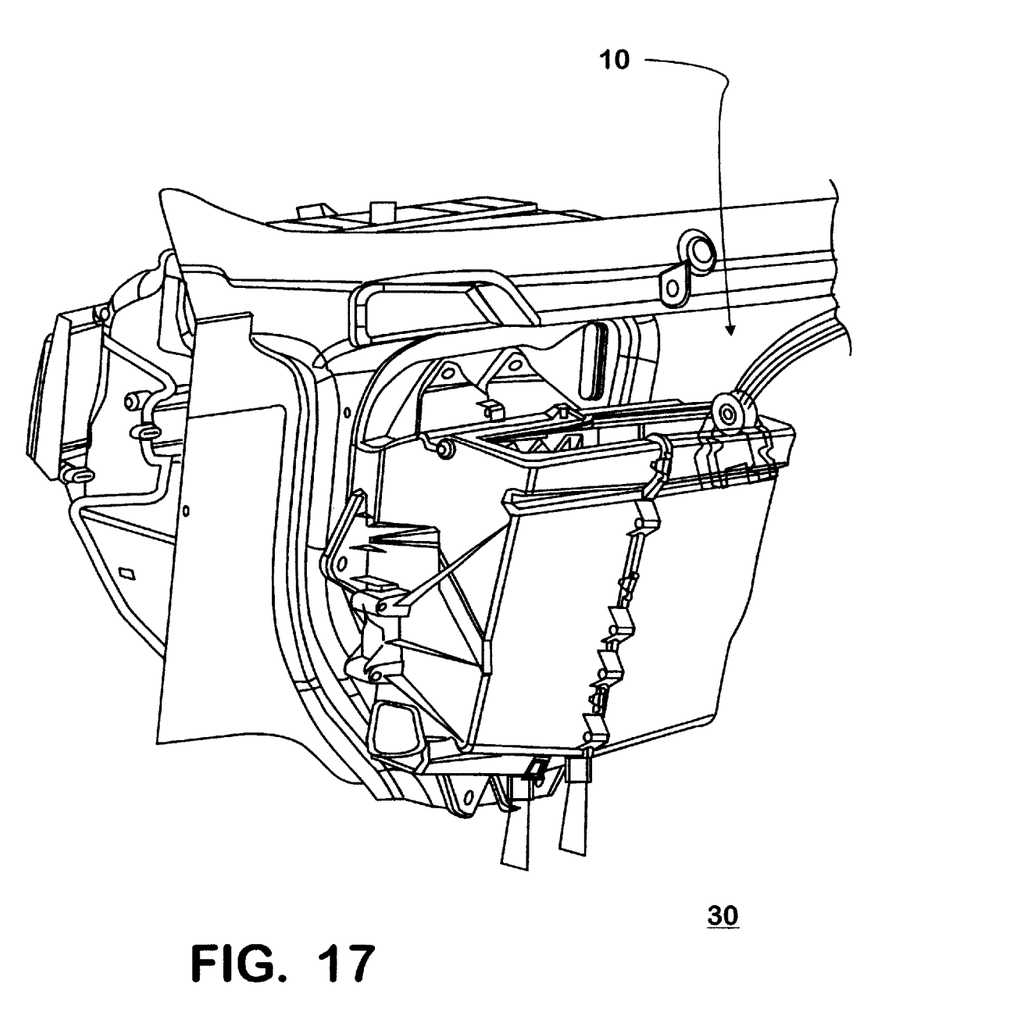
FIG. 17 is a partial perspective drawing of an example of a heating, ventilation, and air conditioning module shown installed in a dash reinforcement and dash assembly made in accordance with this invention.

The second opening in the dash reinforcement 10 opposite the one for mounting of the driver control module 20 would be for accessory vehicle equipment. One example of accessory equipment is a heating ventilation and air conditioning (HVAC) module 30 for providing heating, ventilation, and air conditioning to the cab 101 environment upon installation. An example of such an HVAC module 30 is shown installed in a dash assembly 50 made in accordance with this invention in FIG. 17.

The right side opening 13 and the left side opening 12 may be symmetrical within the dash reinforcement 10 relative to the centerline 108 of the cab 101 and chassis. Symmetry is important because such symmetry will allow engagement of the steering column 21 to a chassis mounted steering gear in the same for orientation for either side. The steering column will be moved with the steering gear. This will allow installation without any shims or means to align the steering system and other components.

The right side opening 12 and the left side opening 13 are preferably formed in a generally five-sided 'Y' shape. Other shapes may be acceptable so long as the driver control module 20 or steering column mounting may be installed in either side of the dash reinforcement 10. The right side 14 of the sheet metal containing the right side 'Y' opening 12 and the left side 15 of said sheet metal containing the left side 'Y' opening 12 are engageable to a portion of the cab 101. These sides of the sheet metal may preferably in close proximity to the forward right side and left side vibration mounting insulators between a forward portion of the cab 101 and the chassis. The 'Y' shape is preferred due to the ability adjust to fore aft cab forces as described in the summary of invention above.

The right side 'Y' opening 12 and the left side 'Y' opening 13 each may contain a piping slot cutout 16 to allow water piping passage from the engine compartment to the cab 101. This piping slot cutout 16 when made is symmetrical in relation to each opening.

The dash panel 70 that is engaged to the dash reinforcement 10 within the dash assembly 50 is uniquely formed. Stamping dies associated with a passenger side of the cab and the driver side of the cab are maneuvered into position on the left and right side of a dash panel raw master panel depending on whether panel will be for left and right hand drive applications. The dash panel 70 is generally asymmetrical about the centerline, The dash panel 70 acts as a heat and noise barrier between the cab 101 and the engine compartment. The dash panel 70 is flat for the majority of its area. The top of the dash panel 70 is flanged to allow assembly with the dash reinforcement 10. The dash panel 70 is made of sheet metal extending vertically the distance from the front edge of the floor 102 of the cab 101 to the lower edge of the windshield area 106. The dash panel 70 spans the distance of the width of the cab 101. The dash panel 70 may be a single integrated stamped piece of sheet metal in the preferred embodiment. The dash panel 70 has a lower center area 71 defined for removal to allow installation over the engine compartment in a conventional engine forward of the cab vehicle application. The dash panel center area 71 is not removed and provides structural support in cab-over-engine vehicle applications. The lower center area 71 has a supporting structure defining the removable lower center area, The supporting structure defining the removable lower center area may be a stamped-in-rib 72 of a shape that partially outlines said removable lower center area.

The dash panel 70 has two large dash panel openings, a right side dash panel opening on a right side of said sheet metal and a left side dash panel opening on a left side of said sheet metal. One of these openings, a steering column opening 73, accommodates a steering column mounting for engagement to the steerable wheels. As with the dash reinforcement, the steering column mounting may be a driver control module 20 containing pedals 22 and a driver steering column 21 for indirect engagement to and control of the steerable wheels upon installation in the vehicle, The opening 73 for the driver control module 20 may be a five-sided 'Y' shape. The other opening, an accessory opening 74, accommodates an accessory component. As with the dash reinforcement 10, one example of accessory equipment is a heating ventilation and air conditioning (HVAC) module 30 for providing heating, ventilation, and air conditioning to the cab 101 environment upon installation. The opening 74 to accommodate an accessory component may be in a 'Y' shape. This double 'Y' configuration is once again for providing strength to accommodate fore and aft forces on the cab 101. The large dash panel 70 openings are being on opposite sides of said removable lower center area 71.

As mentioned above, the top of the dash panel 70 is flanged. This flange 75 allows assembly with the dash reinforcement 10 as shown in FIGS. 12 to 15. Together the dash reinforcement 10 and the dash panel 70 form a dash assembly 50.

The right side opening and the left side opening may have an opening supporting structure in sheet metal of the dash panel 70. These opening supporting structures defining the right side and said left side openings may be stamped-in-ribs 76 and 77 of shapes that partially outline the right side and the left side openings. The stamped-in-ribs 76 and 77 shown in FIG. 14 define a lower portion of the right side and left side openings. This is preferred for the dash assembly 50 to adjust to the fore and aft loading as mentioned above. Other locations for the stamped-in-ribs 76 and 77 may be acceptable, for example along the sides or above the openings.

The side of dash panel 70 containing the opening to accommodate an accessory component has a piping cutout 78 to allow water-piping passage from the engine compartment to the cab upon installation. This piping cutout 78 aligns with the piping slot cutout 16 as shown in FIGS. 8 to 11 upon engagement of the dash panel 70 to the dash reinforcement 10.

The dash panel 70 can be manufactured by relocating the stamping dies for the steering column opening 73 and the accessory opening 74 to the appropriate side of the raw sheet metal for the dash panel 70. The removable lower center area 71 may be cut out following or before stamping for conventional engine forward of cab vehicles. The removable lower center area 71 is left installed to provide additional structural support to the dash panel 70 for LFE or cab-over-engine vehicle applications. The dash panel variations are shown uninstalled to the dash reinforcement 10 in FIGS. 4 to 7 and 12. The dash panel variations are shown installed to the dash reinforcement in FIGS. 8 to 11 and 15. Dash panel 70a is for a conventional left hand drive application; dash panel 70b is for an LFE left hand drive; dash panel 70c is for conventional right hand drive; and dash panel 70d is for an LFE right hand drive. These figures illustrate one of advantages to this invention. Previously, different parts were needed for the different drive and engine mounting applications for the dash reinforcement 10 and separate stamping dies were needed for the different drive and engine mounting applications. These figures illustrate that under this invention, only one dash reinforcement 10 part is required and that only one set of stamping dies are required for the dash panel 70.

Figure 14:
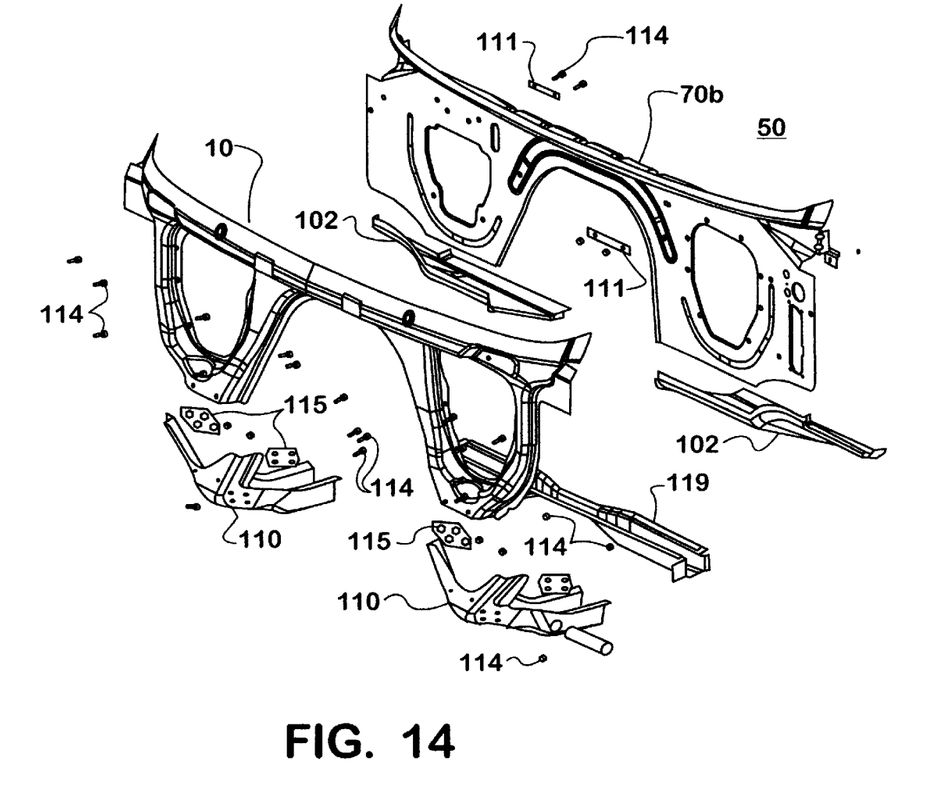
FIG. 14 is an exploded view of a dash assembly made in accordance with this invention.
Figure 15:
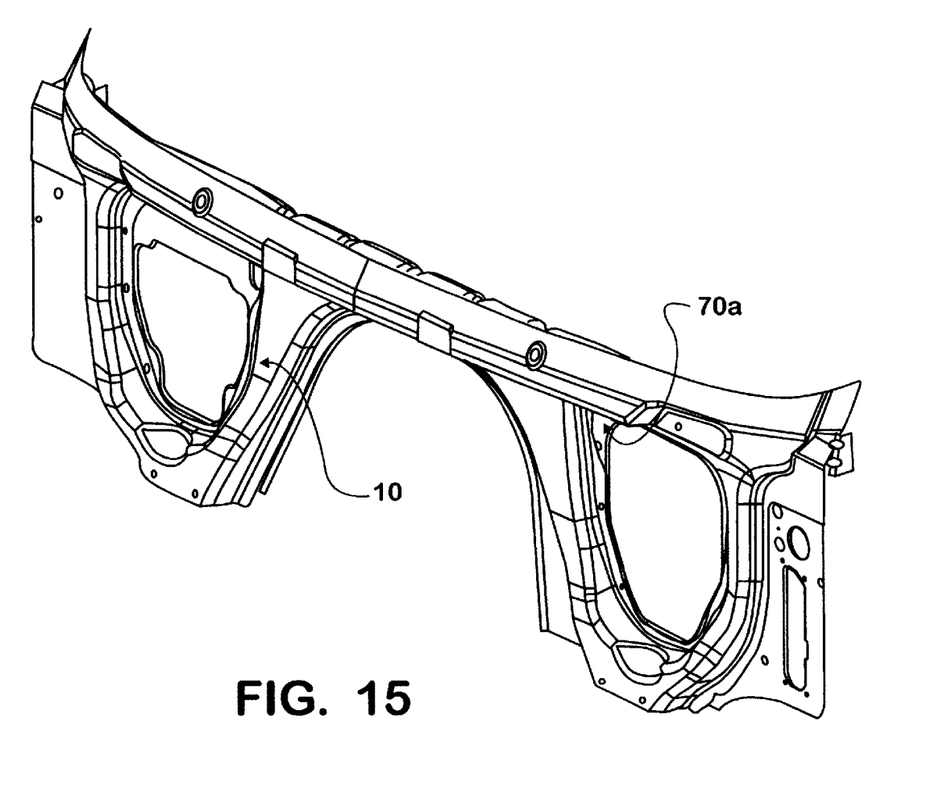
FIG. 15 is the dash reinforcement and dash panel of the dash assembly of FIG. 14.

The dash assembly 50 may have additional components beyond the dash panel 70 and the dash reinforcement 10. These are shown in FIG. 14 and include the following. There are cab vibration mount transition pieces 110 to engage the dash reinforcement to the cab vibration mounts and the cab floor 102. There is horizontal cross piece 119 to assist in the engagement between the transition pieces 110. Additionally, there are mounting brackets 111 and 115 and fasteners 114 to complete engagement of the dash assembly 50. These mounting brackets are for the HVAC 30 and Driver Control Module 20 mounting.

As described above, the dash reinforcement 10, the dash panel 70 for engagement to the dash reinforcement 10 to form a dash assembly 50, and the vehicle cab 101 with the dash assembly 50 installed of the present invention, some of which have been described above and others of which are inherent in the invention. Also modifications may be proposed to the dash reinforcement 10, the dash reinforcement 10 to form a dash assembly 50, and the 50 installed without departing from the teachings herein.

We claim:

1. A dash reinforcement for use in a lower forward portion of a cab of a mobile vehicle, the cab of the vehicle having floor and a windshield area, and a centerline region of the cab that is also along a centerline of the vehicle and the vehicle having an engine compartment and a chassis, the chassis having at least one pair of steerable wheels, comprising:

sheet metal extending vertically the distance from the front edge of the floor of the cab to the lower edge of the windshield and said sheet metal spanning the distance of the width of the cab;

said sheet metal of said dash reinforcement arches to allow installation over the engine compartment;

said sheet metal of said dash reinforcement has two large openings, a right side opening on a right side of said sheet metal and a left side opening on a left side of said sheet metal, one opening to accommodate a steering column mounting for engagement to the steerable wheels and one to accommodate an accessory component;

said right side opening and said left side opening being on opposite sides of said arch over the engine compartment; and said right side opening being a mirror image of the left side opening.

2. The dash reinforcement of claim 1, wherein:

said right side of said sheet metal and said left side of said sheet metal are symmetrical about the centerline of the cab.

3. The dash reinforcement of claim 2, wherein:

said right side opening and said left side opening are formed in a five major sided 'Y' shape.

4. The dash reinforcement of claim 3, wherein:

said right side of said sheet metal containing said right side 'Y' opening and said left side of said sheet metal containing said left side 'Y' opening are engageable to a portion of the cab in close proximity to forward right side and left side vibration mounting insulators between a forward portion of the cab and the chassis.

5. The dash reinforcement of claim 4, wherein:

said sheet metal is a single integrated piece of sheet metal.

6. The dash reinforcement of claim 5, wherein:

said sheet metal is comprised of a high strength metal.

7. The dash reinforcement of claim 6, wherein:

said right side 'Y' opening, said right side of said sheet metal, said left side 'Y', and said left side of said sheet metal are both shaped for and have means for engagement to a driver steering column for indirect engagement to and control of the steerable wheels upon installation in the vehicle.

8. The dash reinforcement of claim 6, wherein:

said right side 'Y' opening, said right side of said sheet metal, said left side 'Y', and said left side of said sheet metal are both shaped for and have means for engagement to a driver control module containing vehicle operator pedals and a driver steering column and steering wheel for indirect engagement to and control of the steerable wheels upon installation in the vehicle.

9. The dash reinforcement of claim 7, wherein:

said right side 'Y' opening, said right side of said sheet metal, said left side 'Y', and said left side of said sheet metal are both shaped for and have means for engagement to said accessory component.

10. The dash reinforcement of claim 9, wherein:

said accessory component is a heating ventilation and air conditioning module for providing heating, ventilation, and air conditioning to the cab environment upon installation.

11. The dash reinforcement of claim 8, wherein:

said right side 'Y' opening, said right side of said sheet metal, said left side 'Y', and said left side of said sheet metal are both shaped for and have means for engagement to said accessory component.

12. The dash reinforcement of claim 11, wherein:

said accessory component is a heating ventilation and air conditioning module for providing heating, ventilation, and air conditioning to the cab environment upon installation.

13. The dash reinforcement of claim 10, wherein:

said sheet metal is formed by a stamping process.

14. The dash reinforcement of claim 12, wherein:

said sheet metal is formed by a stamping process.

15. The dash reinforcement of claim 10, wherein:

said right side 'Y' opening and said left side 'Y' opening each contain a slot cutout to allow water piping passage from the engine compartment to the cab.

16. The dash reinforcement of claim 12, wherein:

said right side 'Y' opening and said left side 'Y' opening each contain a slot cutout to allow water piping passage from the engine compartment to the cab.

17. A dash reinforcement for use in a lower forward portion of a cab of a mobile vehicle, the cab of the vehicle having floor and a windshield area, and a centerline region of the cab that is also along a centerline of the vehicle and the vehicle having an engine compartment and a chassis, the chassis having at least one pair of steerable wheels, comprising:

sheet metal extending vertically the distance from the front edge of the floor of the cab to the lower edge of the windshield and said sheet metal spanning the distance of the width of the cab;

said sheet metal of said dash reinforcement arches to allow installation over the engine compartment;

said sheet metal of said dash reinforcement has two large openings, a right side opening on a right side of said sheet metal and a left side opening on a left side of said sheet metal, one opening to accommodate a steering column mounting for engagement to the steerable wheels and one to accommodate an accessory component;

said right side opening and said left side opening being on opposite sides of said arch over the engine compartment; and said right side of said sheet metal and said left side of said sheet metal are symmetrical about the centerline of the cab.

18. The dash reinforcement of claim 17, wherein:

said right side opening, said right side opening of said sheet metal, said left side opening, and said left side of said sheet metal are both shaped for and have means for engagement to a driver steering column for indirect engagement to and control of the steerable wheels upon installation in the vehicle.

19. The dash reinforcement of claim 17, wherein:

said right side opening, said right side of said sheet metal, said left side opening, and said left side of said sheet metal are both shaped for and have means for engagement to a driver control module containing vehicle operator pedals and a driver steering column and steering wheel for indirect engagement to and control of the steerable wheels upon installation in the vehicle.

20. The dash reinforcement of claim 18, wherein:

said right side opening, said right side of said sheet metal, said left side opening, and said left side of said sheet metal are both shaped for and have means for engagement to said accessory component.

21. The dash reinforcement of claim 20, wherein:

said accessory component is a heating ventilation and air conditioning module for providing heating, ventilation, and air conditioning to the cab environment upon installation.

22. The dash reinforcement of claim 19, wherein:

said right side opening, said right side of said sheet metal, said left side opening, and said left side of said sheet metal are both shaped for and have means for engagement to said accessory component.

23. The dash reinforcement of claim 22, wherein:

said accessory component is a heating ventilation and air conditioning module for providing heating, ventilation, and air conditioning to the cab environment upon installation.

24. The dash reinforcement of claim 21, wherein:

said right side opening and said left side opening each contain a slot cutout to allow water piping passage from the engine compartment to the cab.

25. The dash reinforcement of claim 23, wherein:

said right side opening and said left side opening each contain a slot cutout to allow water piping passage from the engine compartment to the cab.

26. A dash panel for engagement to a dash reinforcement for use in a lower forward portion of a cab of a mobile vehicle, the cab of the vehicle having floor and a windshield area, and a centerline region of the cab that is also along a centerline of the vehicle and the vehicle having an engine compartment and a chassis, the chassis having at least one pair of steerable wheels, comprising:

dash panel sheet metal extending vertically the distance from the front edge of the floor of the cab to the lower edge of the windshield and said dash panel sheet metal spanning the distance of the width of the cab;

said dash panel sheet metal having a lower center area defined for removal to allow installation over the engine compartment in a conventional engine forward of the cab vehicle application, said center area providing structural support in cab over engine vehicle applications;

said lower center area having a supporting structure defining said removable lower center area;

said dash panel sheet metal having two large dash panel openings, a right side dash panel opening on a right side of said sheet metal and a left side dash panel opening on a left side of said sheet metal, one dash panel opening to accommodate a steering column mounting for engagement to the steerable wheels and one to accommodate an accessory component;

said right side dash panel opening and said left side dash panel opening being on opposite sides of said removable lower center area; and a top of said dash panel sheet metal flanged to allow assembly with the dash reinforcement.

27. The dash panel of claim 26, wherein:

said supporting structure defining said removable lower center area is stamped in rib of a shape that partially outlines said removable lower center area.

28. The dash panel of claim 27, wherein:

said right side opening and said left side opening having opening supporting structure in said dash panel sheet metal.

29. The dash panel of claim 28, wherein:

said supporting structures defining said right side and said left side openings are stamped in ribs of shapes that partially outline said right side and said left side openings.

30. The dash panel of claim 29, wherein:

said stamped in supporting ribs of said right side and said left side openings partially define a lower portion of said right side and left side openings.

31. The dash panel of claim 30, wherein:

said dash panel sheet metal is a single integrated piece of sheet metal.

32. The dash panel of claim 31, wherein:

said dash panel sheet metal is formed by stamping.

33. The dash panel of claim 32, wherein:

said opening to accommodate a steering column mounting is shaped for and has means for engagement to a driver control module containing pedals and a driver steering column for indirect engagement to and control of the steerable wheels upon installation in the vehicle.

34. The dash panel of claim 33, wherein:

said opening to accommodate a steering column mounting is a five sided 'Y' shape.

35. The dash panel of claim 34, wherein:

said opening to accommodate an accessory component is shaped for and has means for engagement to said accessory component; and said accessory component is a heating ventilation and air conditioning module for providing heating, ventilation, and air conditioning to the cab environment upon installation.

36. The dash panel of claim 35, wherein:
said opening to accommodate an accessory component is in a 'Y' shape.

37. The dash panel of claim 36, wherein:
said side of dash panel sheet metal containing said opening to accommodate an accessory component has a cutout to allow water piping passage from the engine compartment to the cab upon installation.

38. A dash assembly for use in a lower forward portion of a cab of a mobile vehicle, the cab of the vehicle having floor and a windshield area, and a centerline region of the cab that is also along a centerline of the vehicle and the vehicle having an engine compartment and a chassis, the chassis having at least one pair of steerable wheels, comprising:
a dash reinforcement engaged to dash panel;
said dash reinforcement comprising:
dash reinforcement sheet metal extending vertically the distance from the front edge of the floor of the cab to the lower edge of the windshield and said dash reinforcement sheet metal spanning the distance of the width of the cab;
said dash reinforcement sheet metal of said dash reinforcement arches to allow installation over the engine compartment;
said dash reinforcement sheet metal of said dash reinforcement has two large reinforcement openings, a right side reinforcement opening on a right side of said sheet metal and a left side reinforcement opening on a left side of said sheet metal, one reinforcement opening to accommodate a steering column mounting for engagement to the steerable wheels and one reinforcement opening to accommodate an accessory component;
said right side and said left side reinforcement openings being on opposite sides of said arch over the engine compartment; and
said right side reinforcement opening being a mirror image of the left side reinforcement opening;
said dash panel comprising:
dash panel sheet metal extending vertically the distance from the front edge of the floor of the cab to the lower edge of the windshield and said dash panel sheet metal spanning the distance of the width of the cab;
said dash panel sheet metal having a lower center area defined for removal to allow installation over the engine compartment in a conventional engine forward of the cab vehicle application, said center area providing structural support in cab over engine vehicle applications;
said lower center area having a supporting structure defining said removable lower center area;
said dash panel sheet metal having two large dash panel openings, a right side dash panel opening on a right side of said sheet metal and a left side dash panel opening on a left side of said sheet metal, one dash panel opening to accommodate the steering column mounting for engagement to the steerable wheels and one to accommodate the accessory component; and
said right side dash panel opening and said left side dash panel opening being on opposite sides of said removable lower center area; and
a top of said dash panel sheet metal flanged and said flange engaged to said dash reinforcement.

39. The dash assembly of claim 38, wherein:
said right side and said left side of said of said dash reinforcement sheet metal are symmetrical about the centerline of the cab.

40. The dash assembly of claim 39, wherein:
said right side reinforcement opening and said left side reinforcement opening are formed in a five major sided 'Y' shape.

41. The dash assembly of claim 40, wherein:
said right side of said dash reinforcement sheet metal containing said right side 'Y' reinforcement opening and said left side of said dash reinforcement sheet metal containing said left side 'Y' reinforcement opening are engageable to a portion of the cab in close proximity to forward right side and left side vibration mounting insulators between a forward portion of the cab and the chassis.

42. The dash assembly of claim 41, wherein:
said right side 'Y' reinforcement opening, said right side of said dash reinforcement sheet metal, said left side 'Y' reinforcement opening, and said left side of said dash reinforcement sheet metal are both shaped for and have means for engagement to a driver control module containing vehicle operator pedals and a driver steering column and steering wheel for indirect engagement to and control of the steerable wheels upon installation in the vehicle.

43. The dash assembly of claim 42, wherein:
said right side 'Y' reinforcement opening, said right side of said dash reinforcement sheet metal, said left side 'Y' reinforcement opening, and said left side of said dash reinforcement sheet metal are both shaped for and have means for engagement to said accessory component; and
said accessory component is a heating ventilation and air conditioning module for providing heating, ventilation, and air conditioning to the cab environment upon installation.

44. A cab of a mobile vehicle, the vehicle having an engine compartment and a chassis, the chassis having at least one pair of steerable wheels, comprising:
a floor and a windshield area;
a centerline region that is along a centerline of the vehicle;
a dash assembly comprising a dash reinforcement engaged to dash panel;
said dash reinforcement comprising:
dash reinforcement sheet metal extending vertically the distance from the front edge of the floor of the cab to the lower edge of the windshield and said dash reinforcement sheet metal spanning the distance of the width of the cab;
said dash reinforcement sheet metal of said dash reinforcement arches to allow installation over the engine compartment;
said dash reinforcement sheet metal of said dash reinforcement has two large reinforcement openings, a right side reinforcement opening on a right side of said sheet metal and a left side reinforcement opening on a left side of said sheet metal, one reinforcement opening to accommodate a steering column mounting for engagement to the steerable wheels and one reinforcement opening to accommodate an accessory component;
said right side and said left side reinforcement openings being on opposite sides of said arch over the engine compartment; and said right side reinforcement opening being a mirror image of the left side reinforcement opening;

said dash panel comprising:
- dash panel sheet metal extending vertically the distance from the front edge of the floor of the cab to the lower edge of the windshield and said dash panel sheet metal spanning the distance of the width of the cab;
- said dash panel sheet metal having a lower center area defined for removal to allow installation over the engine compartment in a conventional engine forward of the cab vehicle application, said center area providing structural support in cab over engine vehicle applications;
- said lower center area having a supporting structure defining said removable lower center area;
- said dash panel sheet metal having two large dash panel openings, a right side dash panel opening on a right side of said sheet metal and a left side dash panel opening on a left side of said sheet metal, one dash panel opening to accommodate the steering column mounting for engagement to the steerable wheels and one to accommodate the accessory component; and
- said right side dash panel opening and said left side dash panel opening being on opposite sides of said removable lower center area; and
- a top of said dash panel sheet metal flanged and said flange engaged to said dash reinforcement.

45. The vehicle cab of claim 44, wherein:

said right side and said left side of said of said dash reinforcement sheet metal are symmetrical about said centerline.

46. The vehicle cab of claim 45, wherein:

said right side reinforcement opening and said left side reinforcement opening are formed in a five major sided 'Y' shape.

47. The vehicle cab of claim 46, wherein:

said right side of said dash reinforcement sheet metal containing said right side 'Y' reinforcement opening and said left side of said dash reinforcement sheet metal containing said left side 'Y' reinforcement opening are engageable to a portion of the cab in close proximity to forward right side and left side vibration mounting insulators between a forward portion of said cab and the chassis.

48. The vehicle cab of claim 47, wherein:

said right side 'Y' reinforcement opening, said right side of said dash reinforcement sheet metal, said left side 'Y' reinforcement opening, and said left side of said dash reinforcement sheet metal are both shaped for and have means for engagement to a driver control module containing vehicle operator pedals and a driver steering column and steering wheel for indirect engagement to and control of the steerable wheels upon installation in the vehicle.

49. The vehicle cab of claim 48, wherein:

said right side 'Y' reinforcement opening, said right side of said dash reinforcement sheet metal, said left side 'Y' reinforcement opening, and said left side of said dash reinforcement sheet metal are both shaped for and have means for engagement to said accessory component; and said accessory component is a heating ventilation and air conditioning module for providing heating, ventilation, and air conditioning to the cab environment upon installation.

* * * * *